United States Patent [19]

Corsette

[11] Patent Number: 4,511,065
[45] Date of Patent: Apr. 16, 1985

[54] MANUALLY ACTUATED PUMP HAVING PLIANT PISTON

[76] Inventor: Douglas F. Corsette, 6559 Firebrand St., Los Angeles, Calif. 90045

[21] Appl. No.: 502,273

[22] Filed: Jun. 8, 1983

Related U.S. Application Data

[63] Continuation-in-part of Ser. No. 121,223, Feb. 13, 1980, Pat. No. 4,402,432.

[51] Int. Cl.³ ............................................. B05B 11/00
[52] U.S. Cl. .................................... 222/153; 222/263; 222/321; 222/381; 222/384; 222/401; 137/508; 137/852; 137/855
[58] Field of Search ............... 222/153, 263, 321, 381, 222/383, 384, 401; 137/508, 852, 855; 239/333

[56] References Cited

U.S. PATENT DOCUMENTS

| 3,527,551 | 9/1970 | Kutik et al. | 222/380 X |
|---|---|---|---|
| 4,050,613 | 9/1977 | Corsette | 222/321 |
| 4,155,485 | 5/1979 | Spatz | 222/381 X |
| 4,183,449 | 1/1980 | Blake | 222/321 |

FOREIGN PATENT DOCUMENTS 244406 1/1961 Australia ............................ 222/383

*Primary Examiner*—Joseph J. Rolla
*Assistant Examiner*—Frederick R. Handren
*Attorney, Agent, or Firm*—Watson, Cole, Grindle & Watson

[57] ABSTRACT

A dispensing pump of the pressure accumulating type includes an assembly of a pump body and a separate piston member, the body including a closure cap for securing the assembly in fluid tight communication with the opening of a container of flowable product to be dispensed, a plunger/accumulator forming a variable volume pump chamber together with the piston and being reciprocable relative thereto, and a plunger head surrounding the plunger. The plunger has a vent seal for opening and closing a vent chamber defined around the piston. The closure cap is of a hard and durable material, while the separate piston is softer and more compliant which gives its lip seal good definition which avoids pump chamber leakage as it precisely conforms to the inner diameter of the plunger and to any irregularities thereof. Likewise, the plunger head is of a rigid and durable material, while the plunger is softer and more compliant so that its vent seal will better conform to the vent chamber wall, which it slidingly engages, to avoid leakage of product through the closed vent chamber. The piston has an inlet valve thereon which may be of a wide variety of types.

13 Claims, 8 Drawing Figures

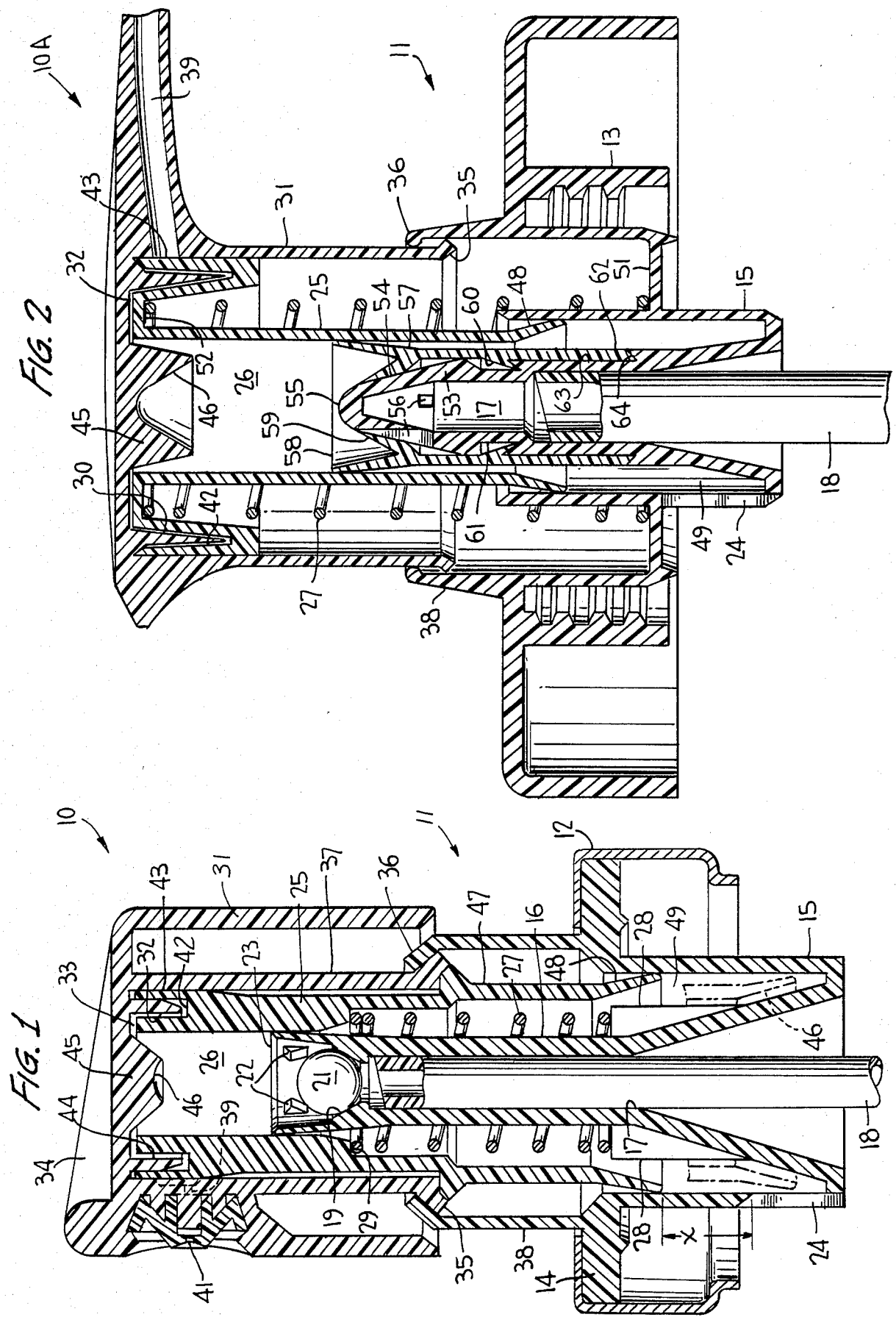

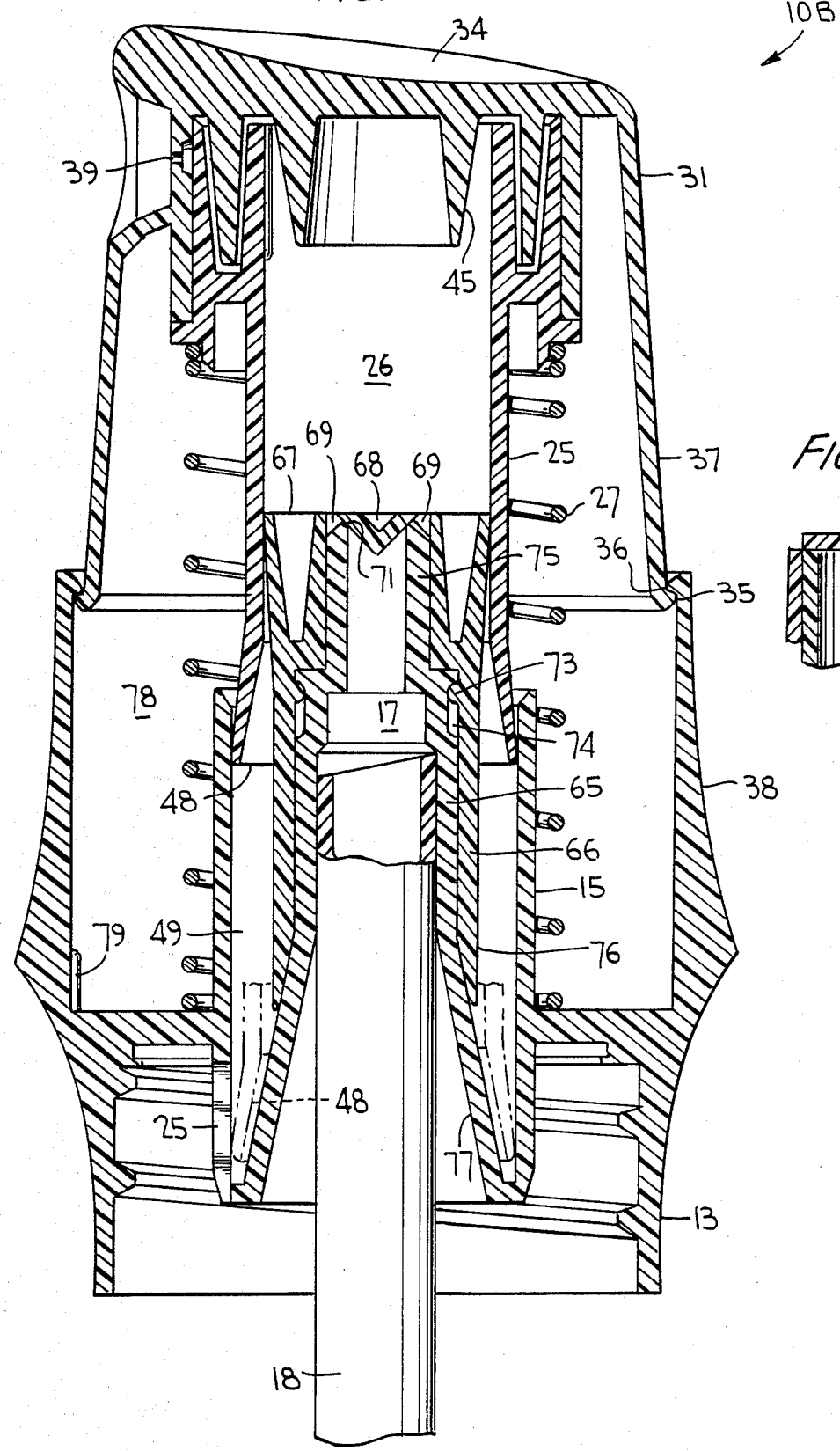
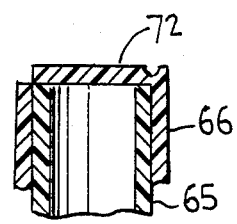

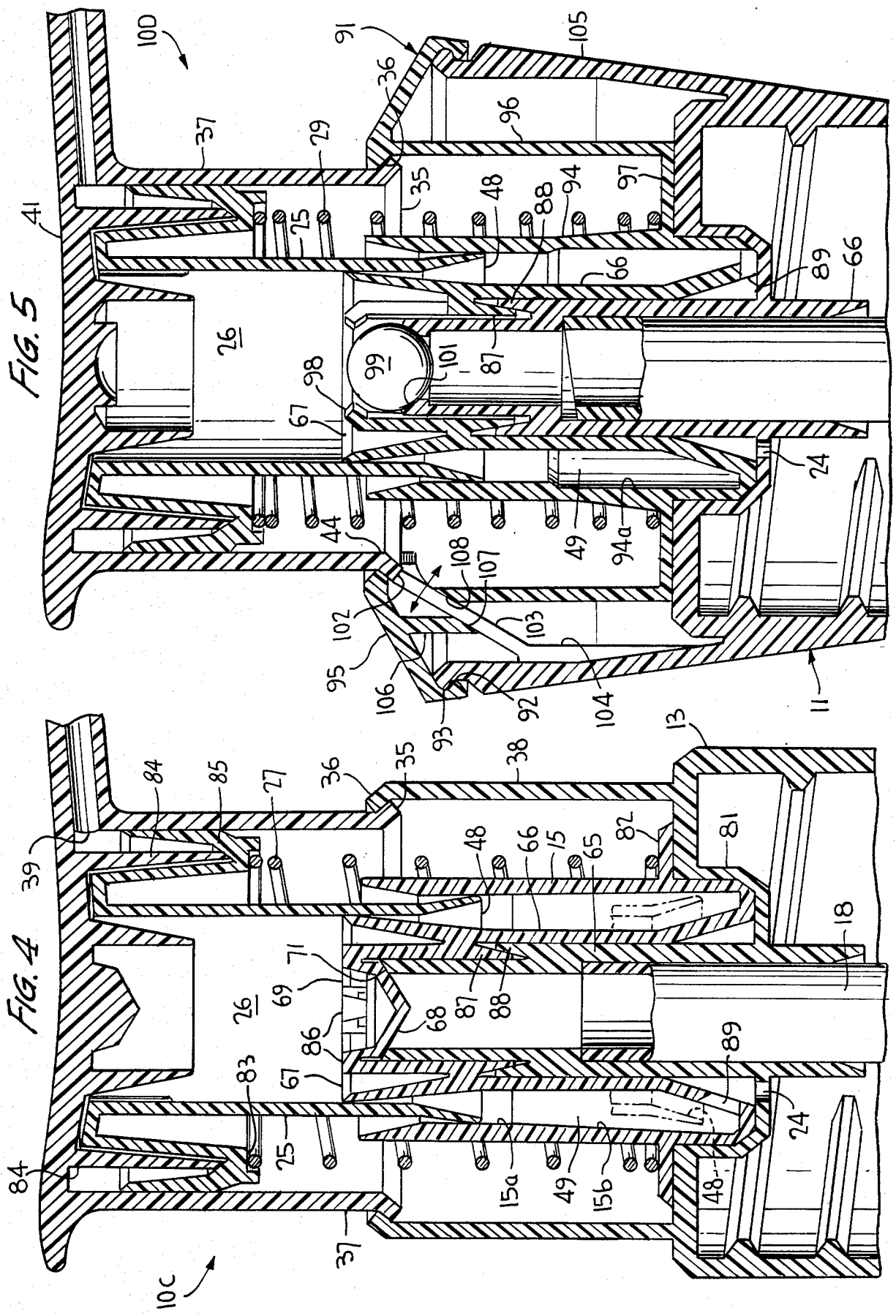

MANUALLY ACTUATED PUMP HAVING PLIANT PISTON

RELATED APPLICATION

This application is a continuation-in-part of my U.S. patent application Ser. No. 121,223, filed Feb. 13, 1980, now U.S. Pat. No. 4,402,432.

BACKGROUND OF THE INVENTION

This invention relates generally to a dispensing pump of the pressure accumulating type, and more particularly to such a pump in which its piston forms a separate part from that of the pump body which includes a closure cap for securing the pump body to a container of flowable product to be dispensed, the separate piston being of a material which is softer and more compliant than that of the pump body.

The aforementioned related application discloses a pump of the pressure-accumulating type which improves upon the dispensing pump disclosed in my U.S. Pat. No. 4,050,613 by the provision of a container vent chamber opening and closing feature. An annular lip seal on an upstanding piston engages a surrounding reciprocable plunger/accumulator and therewith defines a variable volume pump chamber, and a vent seal on the plunger skirt engages a surrounding cylindrical wall for therewith defining a container vent chamber which includes a vent opening. The piston lip seal is designed to prevent leakage of product from the pump chamber during the plunger compression stroke (except at the end of a full downstroke during pump priming), and the vent seal is designed to prevent leakage of product from the vent chamber in a raised position of the plunger and during an initial downstroke thereof.

The pump body of this pump, which includes a closure cap capable of tightly sealing the pump body over the neck of the container of flowable product to be dispensed, should be rugged and of a relatively hard material to withstand the rigors of securing the pump body on to the container. On the other hand, the piston should be of a more pliant and softer material so that its lip seal is capable of more precisely conforming to the tubular shape of the plunger/accumulator and to any irregularities in that shape to avoid leakage from the pump chamber.

Moreover, the plunger head needs to be of a rugged and relatively hard material to not only withstand repeated manipulation during the pumping operation, but to provide a reliable stop for limiting its fully raised position above pump body as a stop shoulder on its skirt engages a stop shoulder on the pump body or on the piston member in such fully raised position. And, it is desirable for the plunger/accumulator to be a softer and more pliant material so that its lip seal will conform more precisely to the cylindrical vent chamber wall on the pump body and to any irregularities in that wall so as to avoid undesirable leakage of product from the vent chamber.

In many dispensing pumps of the pressure accumulating type, the piston is formed integrally with the pump body, thereby making it difficult to fulfill the need for both a rigid pump body and a softer and more compliant pump piston.

Moreover, since the pump pistons of the pumps shown in the aforementioned related application likewise function as an inlet valve control, the types of inlet valves available are limited when the piston is made integral with the body and/or when the piston is not of a sufficiently pliant material for accurately controlling the opening and closing of the inlet.

SUMMARY OF THE INVENTION

It is therefore an object of the present invention to provide a dispensing pump of the pressure accumulating-type in which the piston is not only made separate from the pump body but is also of a softer and more pliant material than the pump body, to thereby achieve a rugged and durable pump body which includes the closure cap, while at the same time obtaining an improved piston quality with improved piston lip seal definition and at the same time increasing the types of piston/inlet valves available for the pumps.

Another object of the invention is to provide such a dispensing pump wherein the plunger head is made of a hard and durable material, and the plunger/accumulator is made of a softer and more pliant material which gives good definition and improves the quality of its vent seal for positively preventing leakage of product from the vent chamber.

A further object of the present invention is to provide such a dispensing pump wherein the piston comprises an axially movable sleeve on an upstanding tubular post connected to the pump body and having an inlet passage, the shifting sleeve functioning to open and close the inlet passage in response to changes in pressure within the pump chamber.

A still further object of the invention is to provide such a dispensing pump wherein the post has a conical wall at its upper end containing inlet ports, and the inlet valve on the piston comprises an annular flange of frustoconical configuration matching the conical wall for opening and closing the ports.

A still further object of the present invention is to provide such a dispensing pump wherein the slideable piston sealingly engages the post for preventing air from entering the pump chamber on the suction stroke and for supporting the piston against the force of pump pressure during the compression stroke.

A still further object of this invention is to provide such a dispensing pump wherein a cylindrical wall defining the vent chamber together with the piston may be formed integrally with either the pump body or with the piston;

A still further object of the invention is to provide such a dispensing pump wherein the piston/inlet valve comprises a sleeve mounted against axial movement on a post upstanding from the pump body, the upper end of the post defining a valve seat, and the inlet valve comprising an annular resilient valve having ports therein;

A still further object of the present invention is to provide such a dispensing pump wherein the fixed piston sleeve sealingly engages the post to avoid the entry of air into the pump chamber during the suction stroke of the plunger;

A still further object of the invention is to provide such a dispensing pump wherein the inlet valve of the piston sleeve fixed on the post comprises a flexible flap valve.

A still further object of this invention is to provide such a dispensing pump wherein the piston sleeve engages the post to define an annular packing seal for sealing the pump chamber against entry of air during the suction stroke of the plunger, such a packing seal functioning in a like manner when connected to a rotatable lock ring of a plunger lock-up or lock-down pump.

Other objects, advantages and novel features of the invention will become more apparent from the following detailed description of the invention when taken in conjunction with the accompanying drawings.

BRIEF DESCRIPTION OF THE DRAWINGS

FIGS. 1 to 7 are vertical sectional views of various dispensing pump embodiments according to the invention having particular inlet valves; and FIG. 3A is a partial sectional view of another type inlet valve available for the FIG. 3 pump.

DETAILED DESCRIPTION OF THE INVENTION

Figure 7:
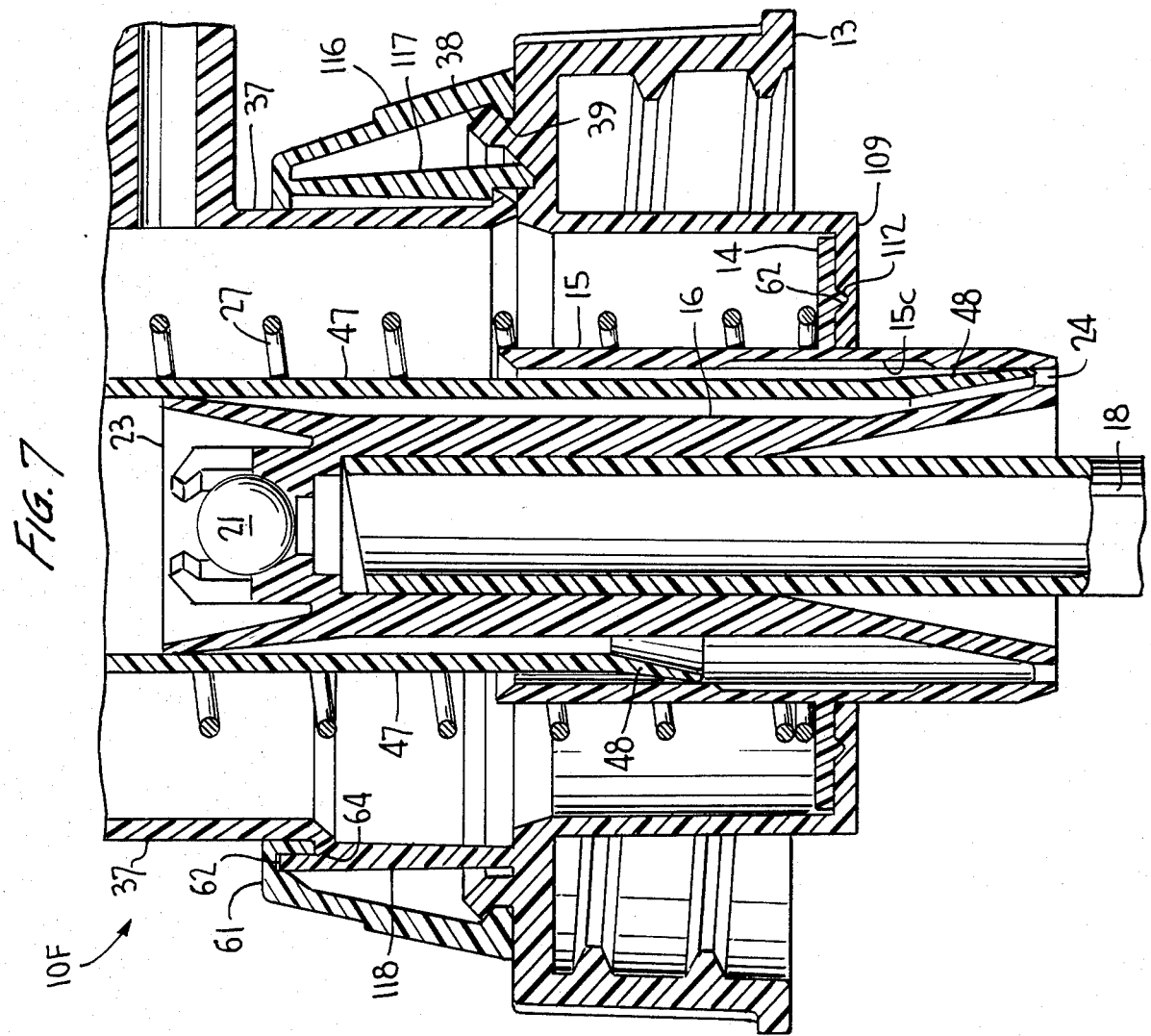

Turning now to the drawings wherein like reference characters refer to like and corresponding parts throughout the several views, a pump assembly is generally designated 10 in FIG. 1 and is the same as FIG. 2 of my aforementioned related application. Thus, the pump assembly comprises a pump body 11 which, in this including embodiment, constitutes a closure cap 12 in the form of a ferrule for snap fitting the pump assembly on to the neck of a container (not shown) of flowable product to be dispensed. Otherwise, the cap may be internally threaded for engaging the threads of the container neck, or the pump body may include an upstanding post and vent chamber wall with an integral closure cap as shown at 13 in FIGS. 2 to 7 to be more fully described hereinafter.

Pump body 11 of this embodiment solely comrises ferrule 12. The piston member includes a radially extending annular flange 14 which sealingly engages the ferrule in some suitable manner, and which sealingly engages the upper edge of the container neck when the ferrule is snapped thereon. The piston member further includes a cylindrical wall 15 which depends from flange 14 and surrounds an upstanding piston 16 in spaced relation. The piston has an inlet passage 17 extending therethrough which receives and is coupled to a conventional dip tube 18 having its lower end extending into the product to be dispensed from the container. An inlet valve is provided at the upper end of the piston in the form of a ball seat 19, a ball check valve 21 being seated thereon for closing inlet passage 17 during the compression stroke, and a plurality of detents 22 being located on an annular lip seal 23 provided at the upper end of the piston and spaced slightly upwardly of the ball valve to permit unseating thereof during the suction stroke.

An elongated container vent opening 24 extends through a lower portion of wall 16 so as to permit equalization of pressures within and outside the container as in the conventional manner so as to replace the product dispensed from the container with air to avoid collapse of the container and a pressure lock condition within the pump.

A tubular plunger 25 encircles and cooperates with the stationary piston and is reciprocable thereon to define therewith a variable volume pump chamber 26. A coil spring 27 bears against abutments 28, extending radially outwardly of the piston, and an annular shoulder 29 provided on the plunger for resiliently urging the plunger upwardly toward its fully raised position and normally maintaining it in that position.

A plunger discharge head 31 has a downwardly directed blind socket 32 which snugly and slideably receives plunger 25 and defines therewith an enclosed variable volume accumulation chamber 33 communicating through the tubular plunger with the valve controlled upper end of inlet passage 17. This accumulation chamber has an appreciably larger diameter than the pump chamber, and the annular upwardly presented end of the plunger is exposed to downward fluid pressure within the accumulation chamber in opposition to the upward thrust of return spring 27.

The plunger head is formed at its upper end as having a finger piece 34 so that intermittent finger pressure conveniently applied to it may be transmitted to plunger 25 for producing reciprocation thereof on stationary piston 16, each depression of the plunger being yieldably resisted by spring 27 which returns the plunger to its fully raised position following each withdrawal of finger pressure.

Upward movement of the plunger head is positively limited by any suitable means such as annular cooperating stop shoulders or ribs 35, 36, respectively provided on a skirt 37 depending from the plunger head and an upstanding cylindrical wall 38 on flange 14. These stop shoulders, as compared to similar stops disclosed in my prior U.S. Pat. No. 4,050,613, need not sealingly engage one another in the raised plunger position of FIG. 1 since, as will be seen, leakage of product through the container vent with the plunger in the FIG. 1 position is positively prevented and leakage is likewise prevented even after an initial plunger downstroke.

A discharge orifice 39 defining a discharge passage extends through the wall of the plunger head and is adapted, as in any normal manner, to convey the dispensed product from the accumulation chamber into the atmosphere through an adjacent nozzle 41. And, as in my aforementioned patent, the discharge orifice opens into the blind socket below the blind upper end thereof at a location such that its upper end is normally covered by the plunger when the latter is projected into its fully upward position as in FIG. 1 into the blind end of socket 33 by spring 27.

At the upper end of the plunger is an annular groove 42 defining an annular discharge valve flange 43 having an upper end lying slightly above the discharge orifice. This flange bears against a ring 44 provided on the plunger head so as to thereby establish the accumulation chamber. The discharge passage is therefore opened more slowly during relative reciprocation between the plunger and the piston, as compared to that disclosed in FIG. 4.

The upper inner end of the plunger head has a downward extension 45 with a part-spherical inner end 46 for matching the contour of the upper end of the piston defined by a portion of the ball valve and by detents 22 and lip seal 23. The upper end of the piston and the opposing inner end of the plunger head are therefore complementarily contoured so that when brought in face-to-face contact during a depression of the head, before the dispensing operation, any air which accumulated in pump chamber 26 may be substantially purged by venting it through the discharge as that air is compressed and acts on the larger diameter accumulation chamber so as to shift the plunger relative to the discharge for the opening of same. After air is purged from the pump chamber as in the manner described in my parent application Ser. No. 121,223, subsequent intermittent finger pressure on the plunger head functions to prime the pump by drawing the flowable product upwardly through the dip tube and the hollow piston into the pump chamber. After priming, initial downstroke of the plunger head causes the plunger to move downwardly on the piston during the compression stroke, thereby compressing spring 27. As the compression stroke continues, there will manifestly be a progressively increasing fluid pressure within the accumulation chamber 33 until such pressure creates a downward force on the plunger sufficient to overcome the resilient upward thrust of the spring. This will result in downward movement of the plunger within the plunger head socket sufficient to unseat the plunger from the blind upper end of the socket and to uncover the end of the discharge passage whereby the contents of the chamber 26 will be discharged under pressure therethrough. Such discharge will continue so long as the pressure of fluid or product within the accumulation chamber is sufficient to maintain the plunger thus displaced downwardly with respect to the plunger head so as to maintain the discharge passage uncovered.

Then, as similarly described in my aforementioned patent and related application, whenever the pressure within the accumulation chamber becomes insufficient to maintain the discharge passage open, either because of insufficient finger pressure on the plunger head or through discharge of the pump chamber and accumulation chamber content near the end of the downstroke, the spring pressure will again reseat the plunger within the plunger head socket so as to close the discharge passage. As the finger pressure is released to permit the return stroke, the passage will remain closed and a new charge of product will be drawn into the pump chamber through the unseated inlet ball valve as the plunger and head are restored to their normally raised position by the pump spring.

The plunger has an annular skirt 47 terminating in an annular vent seal 48 disposed in sealing engagement with the inner surface of wall 15, as shown in the fully raised (solid outline) position of FIG. 1. Thus, during reciprocation of the plunger relative to the piston as aforedescribed, beyond a distance x and into a position shown in phantom outline in FIG. 1, vent seal 48 is moved downwardly below the top of vent opening 24 to thereby open the vent. The space between the cylindrical wall 15 and piston defines a vent chamber 49 in open communication with the interior of the container via vent opening 24. And, when in the vent open position, the vent chamber opens to atmosphere through stop shoulders 35, 36. The vent chamber is not only closed by vent seal 48 in the solid outline position of FIG. 1, but also during an initial downstroke of the plunger until it moves a distance greater than x. Thus, the vent chamber remains closed to prevent leakage of product from the container while the pump is both in its storage and shipping or handling position of FIG. 1, as well as when the plunger head is accidentally or otherwise nudged causing downstroke movement of the plunger up to the distance x. Beyond this distance the vent chamber opens as aforedescribed. The size and location of vent opening 24 may be chosen so as to vary distance x for the particular product to be dispensed and the type of dispensing operation desired.

Because the ferrule or closure cap 12 is to be snap fitted or threaded to the neck of the container of flowable product to be dispensed, the cap must be hard and durable to withstand the pump assembly mounting operation and to ensure a tight and leakproof fit with the neck of the container. Thus, the closure cap may be of a hard metal or may be of polypropylene or like material. On the other hand, lip seal 23 of the piston should be of a softer and more pliant material than that of the closure cap to give good definition which allows it to precisely conform to the inner diameter of plunger 25 and to any out-of-round or other irregularities thereof. Thus, the piston member may be formed of a high-density polyethylene material, or the like. It is thus assured that any leakage of product from the pump chamber around lip seal 23 is positively avoided.

And, plunger head 31 should be of the same rigid material as that of closure cap 12, preferably polypropylene, to withstand repeated manipulation during the pumping operation. On the other hand, plunger 25 should be of a relatively softer and more pliant material, such as a high-density polyethylene, to give good definition to vent seal 48 which must conform precisely to the inner diameter of wall 15 and to any of its irregularities, such as out-of-roundness and the like. By making the piston separate from the closure cap and more compliant, these parts are rendered most suitable for the purposes intended and gives rise to the production of a high quality piston from a wider choice of materials. And, as will be seen, this allows for a wider selection of differently styled pistons/inlet valves.

Pump 10A of FIG. 2 is similar to pump 10 of FIG. 1 so like parts will be identified by like reference numerals. However, pump body 11 is differently structured and includes an integral closure cap 13 internally threaded for engagement with the outer threads of the neck of the container (not shown). Otherwise, the closure cap may be provided for snap-fitting it in place. An annular flange 51 of the pump body supports one end of return spring 27, and the underside of a flange 52 at the upper end of plunger 25 supports the other end of the return spring. Cylindrical wall 15 is integrally formed with flange 51 at the inner end thereof, and defines vent chamber 49 together with an integrally formed upstanding post 53 having inlet passage 17 in which dip tube 18 is seated. The upper end of the post is conically shaped as at 54 and is closed at its upper terminal end by a dome or central plug portion 55, the conical surface having a plurality of inlet ports 56 therein. A hollow, sleeve-like piston 57 surrounds the post and is axially movable relative thereto for opening and closing the inlet ports in response to changes in pressure within the pump chamber respectively during the suction and compression strokes of the plunger. The piston has an annular lip seal 58 at its upper end and a centrally apertured annular flange 59 of conical frustum configuration, the inner surface of this flange sloping to match that of surface 54 and tapering to a paper thin outer edge. This central aperture becomes the intake port of the pump when the piston is shifted away from the container by the suction of the intake stroke, as assisted by friction on the plunger wall. When the piston is at its inward limit of travel, the central aperture is closed by plug 55 thereby serving as a check valve for the compression stroke. Central plug portion 55 may contact annular flange 59 on its underside in a continuous annular seal adjacent the central piston aperture, or may enter the aperture in the manner of a cork to an extent.

The piston carries an inwardly directed annular flange 60 which sealingly engages the post at a constriction 61 thereof to prevent air from entering the pump chamber on the suction stroke, and to limit the travel of the piston outwardly of the container. Flange 60 may, as shown, be of a conical frustum-type opening upwardly from its inner edge to aid in molding the piston part.

And, the lower and inner end 62 of the piston engages an annular cutout section 63 of the post and serves to slidingly guide the piston as it reciprocates on the post, keeping its axis aligned with the post. And, lower end 62 engages an annular stop shoulder 64 formed on the post at the lower end of cutout section 63 so as to limit the inward travel of the piston to the point where the inlet valve is securely closed and to prevent excessive lost motion of the pumping strokes or undue wedging of the valve members together. This engagement also supports the piston against the force of pump pressure during the compression stroke.

As in the FIG. 1 embodiment, the pump body which includes the closure cap, is of a hard and durable material (for example, polypropylene), while piston 57 is of a softer and more pliant material (for example, a high-density polyethylene) both for the same purposes as described earlier. Moreover, the plunger head is of a relatively hard and durable material, which may be the same or similar to that of the pump body, while the plunger is relatively softer and more compliant, similarly as the piston. This gives good definition to lip seal 58 and to vent seal 48 for the same purposes described with reference to FIG. 1.

Dispensing pump 10B of FIG. 3 is similar to pump 10A of FIG. 2 except for the particular type inlet valve, and a means provided for additionally or alternatively aiding in priming of the pump. Such a means is provided by skirt 37 and cylindrical wall 38 as being respectively spaced outwardly of the plunger and of wall 15 to thereby enclose the volume of space beneath plunger head 31. Skirt 37 functions as a piston relative to wall 38 upon reciprocation of the plunger head so that stop shoulder 35 is in sealing engagement with the inner surface of wall 38 throughout the reciprocating movement.

The stationary piston of the FIG. 3 embodiment is formed by an upstanding post 65 surrounded by a hollow sleeve-like piston 66 having an annular lip seal 67 at its upper end. The piston also has an integrally molded valve shown in the form of a flexible poppet valve 68 having inlet ports 69 therein. The valve is of an upwardly open conical shape normally seated against a valve seat 71 formed at the upper end of post 65 for closing the inlet passage through the hollow post during the compression stroke, the valve flexing upwardly and becoming unseated from its valve seat for opening the inlet passage during the suction stroke. Otherwise, the inlet valve may be in the form of a flap valve 72, as shown in FIG. 3A and as likewise shown in my prior U.S. Pat. No. 4,050,613, or may be in the form of an annular resilient valve, or other alternate forms. And, the piston sleeve sealingly engages the upstanding post and is retained thereon by an annular rib 73 extending into an annular groove 74 on the post.

It should be pointed out that the smaller diameter upper end 75 of the post has an outer conical surface (too slight to clearly illustrate) which tapers inwardly from bottom to top, and the surrounding upper portion of the valve sleeve has a matching taper which thereby provides some assembly relief and also provides a tight seal between the two members in the manner of an annular bunsen valve to ensure against loss of compression from the pump chamber. Also, the pump chamber pressure improves upon the security of this seal.

And, piston skirt 76 is flared outwardly at its inner surface to ease in the assembly of the piston over upper end 75 of the post, and to provide axial stability of the piston as this flared skirt sealingly engages a conical wall 77 of the pump body in the manner of an annular resilient valve to ensure against admitting air through the pump chamber on the suction stroke especially when pumping heavy liquids and semi-solids.

Cooperating skirt 37 and wall 38 together define an air chamber 78 beneath the plunger head and outwardly of the plunger and wall 15. An axial rib 79 is disposed on the inner surface of wall 38 at the bottom thereof.

The pump operates in the same manner as described with reference to FIG. 3 of my parent application Ser. No. 121,223. And, the pump body which includes the closure cap is formed of a hard and durable material such as polypropylene, while the piston skirt is formed of a softer and more pliant material such as a high-density polyethylene, both for the purposes described with reference to the foregoing embodiments. Likewise, plunger head 31 may be formed of the same hard and durable material as the pump body, while plunger 25 can be formed of the same softer and more pliant material as the piston skirt, again for the same purposes as described with reference to the foregoing embodiments. In addition, it should be pointed out that since the pump body in both these FIGS. 2 and 3 embodiments includes upstanding cylindrical wall 38 with its stop shoulders 36, the harder cooperating materials of the plunger head and the pump body serve to extend the useful life of these parts.

A dispensing pump 10C shown in FIG. 4 has an upstanding post 65 carrying the dip tube similarly as in FIG. 3. However, piston sleeve 66 is made integral with wall 15 and is seated at its lower end within a cup-shaped portion 81 of the pump body which presents a cork-type seal.

An annular flange 82 extends radially outwardly of wall 15 and bears tightly against the upper surface of the closure cap. The return spring extends between a shoulder 83 of the plunger and this flange 82 for sealingly holding the piston member in place, and for also holding head skirt bead 35 sealingly against retention bead 36 of the pump body. The discharge valve is likewise maintained sealingly closed as annular ring 84 on the plunger head engages annular discharge valve flange 85, as shown.

And, in addition to the cork-type seal presented between the lower end of the piston member and cup-shaped portion 81, seal means may be provided between flange 82 and the upper surface of the closure cap, such as seal beads, a tongue-and-groove arrangement, a chevron, etc. An intake poppet valve 68, similar to that of FIG. 3, is provided at the upper end of the piston sleeve and is resiliently urged into its seated position against valve seat 71 by means of integral valve springs 86.

Axially extending annular lip seal 87 and 88 are respectively provided on the piston and the post and sealingly interengage to avoid entry of air into the pump chamber during the compression stroke. And, other valve configurations, such as a flapper valve, an annular resilient valve, etc., are also appropriate for this assembly since no rotary motion is needed between the valve and its seat, and the valve is urged closed by the relative dimensional positioning of the valve-to-seat interface and the elasticity of the valve support members. Also, the poppet valve, or flapper, etc., could be flat, spherical or other shapes in cross-section.

And, in the FIG. 4 embodiment, wall 15 is cylindrical at its upper portion 15a so that vent chamber 49 remains closed to the atmosphere by vent seal 48 while in contact therewith. Wall 15 extends gradually outwardly along its annular extent at its lower portion as at 15b so that a gradually increasing annular gap is formed between vent seal 48 and the inner surface of this lower portion as the plunger extends to its phantom outline position. In this position, the container communicates with the atmosphere through the open vent chamber via vent openings 24 and 89, and through the non-sealed engagement between retention beads 35 and 36.

And, as in the aforedescribed embodiments, the pump body which includes the closure cap and the upstanding piston is of a more rigid and durable material than the piston member which in pump 10C includes cylindrical wall 15. Likewise, the plunger head is of a harder and more durable material than that of the plunger.

FIG. 5 discloses a dispensing pump 10D which is the same as the pump shown in FIG. 1 of my U.S. Pat. No. 4,343,417, dated Aug. 10, 1982. And, pump 10D is essentially the same as pump 10C of FIG. 4 except for the different type inlet valve and an annular control member 91 integrally formed with the separate piston member for relative rotary movement on pump body 11 by means of cooperating lugs 92, 93, respectively provided on the members. The control member includes an integral cyindrical wall 94 having an enlarged diameter 94a at the lower portion thereof. Vent seal 48 engages the inner surface of wall 94 in the fully raised and locked position of the plunger of FIG. 5 to thereby close vent chamber 49 and to prevent any leakage of product from the container through the vent openings 24 and 89 and out through the pump when the plunger is disposed in this position. When the plunger head is unlocked and during plunger reciprocation, vent seal 48 is disposed adjacent enlarged diameter 94a and therewith defines an annular gap which opens the vent chamber and facilitates container venting.

The control member includes an annular ring 95 and an outer cylindrical wall 96 depending therefrom, a transversely extending annular wall 97 interconnecting cylindrical walls 94 and 96 and overlying the top wall of the closure cap. The control member further includes tubular piston sleeve 66 which is the same as the FIG. 4 piston except that ball retention fingers 98 are provided at its upper end for capturing a ball check valve 99 during the suction or fill mode of the dispensing operation. This ball check valve is fully seated against an inlet valve seat 101 provided at the upper end of post 66, during the plunger compression stroke for closing the inlet during the dispensing operation.

A lower edge 102 of plunger skirt 37 defines an annular stop shoulder encircling the plunger and is located at a predetermined level such that in the fully raised or projected position of the plunger, shown in FIG. 5, the stop shoulder is adapted for coaction with the locking means which is described in detail in my U.S. Pat. No. 4,343,417.

Briefly, locking fingers 103 are affixed as by molding at base 104 thereof to the inner surface of an upstanding wall 105 of the pump body. These locking fingers are equally spaced apart and have free ends in abutting engagement with stop shoulder 102 when in the plunger head locking position of FIG. 5.

For unlocking the plunger head to facilitate plunger reciprocation, each locking finger extends through a cam slot located between a depending flange 106 and cylindrical wall 96, confronting edges 107 and 108 formed at the cam slot causing each finger to move outwardly to unlock the plunger, and to move inwardly to lock the plunger, upon relative rotary movements of control member 91.

Despite the relative rotary movement of the tubular piston relative to the upstanding post, upon operation of the control member, interengagement of the tapered annular flanges 87 and 88 provides an effective rotary seal which prevents loss of pressure from the pump chamber.

As in each of the aforedescribed embodiments, the pump body of FIG. 5, which includes the closure cap and the upstanding post, is of a rigid and durable material, while the piston sleeve and the integrally formed control member are more compliant and of a softer material. Moreover, the plunger head may be of the same or similar hard material as the pump body, and the plunger is of a softer and more pliant material, all for the reasons discussed earlier.

Figure 6:
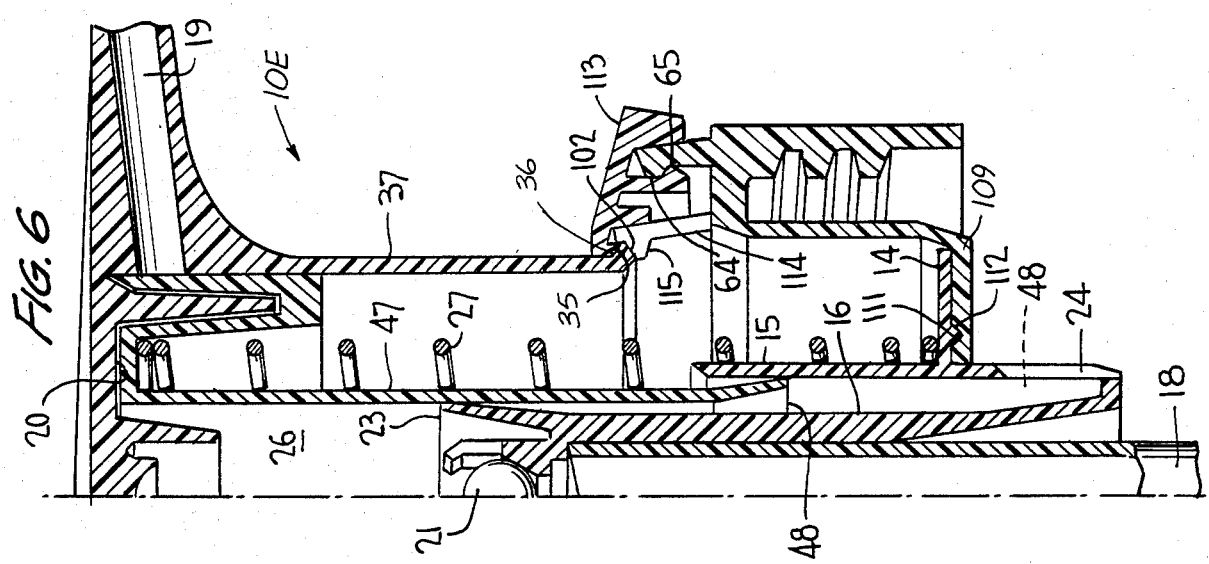

FIG. 6 is the same as FIG. 3 of my U.S. Pat. No. 4,343,417, and compares with FIG. 1 hereof in that hollow piston member 16 directly supports the dip tube. Flange 14 extending from cylindrical wall 15 overlies an inwardly extending flange 109 of the pump body and is sealingly engaged therewith via, for example, an annular sealing tongue 111 on flange 14 which projects into an annular groove 112 located in flange 109.

A control ring 113 is mounted for rotation on closure cap 13, and locking fingers 114 on the cap have inwardly extending locking pawls 115 which are moved into and out of engagement with edge 102 as upper ends of the locking fingers engage in cam grooves provided at the underside of the control member.

Thus, the pump body and the piston are not only formed separately, but are, in accordance with the invention, respectively of harder and softer materials for the purposes aforedescribed. And, the plunger head and the plunger are likewise respectively of harder and softer materials for those reasons discussed hereinabove.

Still another dispensing pump, which incorporates the present invention, is shown at 10F in FIG. 7 which differs from pump 10E only in that it incorporates an optional lock-up and/or lock-down plunger head arrangement essentially as shown in my copending U.S. patent application Ser. No. 469,118. Thus, a control ring 116 is coupled to the closure cap for relative rotary movement and has depending locking fingers 117 projecting into cam grooves located on the upper surface of the closure cap, and such upper surface has upstanding locking fingers 118 which project into cam grooves on the underside of the control ring upper surface. A plunger head lock-up condition is shown to the left in FIG. 7, and a plunger lock-down condition is shown to the right in this Figure.

Cylindrical wall 15 has an enlarged inner diameter lying substantially between opposing ends of the wall so as to form a barrel shape as at 15c. As shown to both the left and the right in FIG. 7, vent skirt 48 engages the inner surface of wall 15 respectively in both the fully raised and the fully depressed positions of the plunger head to thereby close the vent chamber and to prevent any leakage of product from the container through vent opening 24 out through the pump when the plunger is disposed in such positions. Otherwise, during plunger reciprocation, vent seal 48 opens the vent chamber when it lies juxtaposed to large diameter 15c which presents a gap with this vent seal and thereby defines an open vent chamber.

It should be pointed out that the various vent opening and closing features 24, 15b, 94a and 15c are interchangeable among the several pumps disclosed.

From the foregoing, it can be seen that a more compliant piston member may be provided without restricting the selection of material required for that of the pump body which includes the closure cap, since the two parts are separate and are comprised of different materials which satisfy different needs. The same applies for the plunger head and the plunger which are likewise made of different materials to satisfy different needs. Both the piston lip seal and the vent seal achieve good definition as they are more compliant which thereby assures fluid tight pump and vent chambers. And, for those pumps having an upstanding post made of more rigid material with a surrounding piston sleeve of softer and more pliant material, a fluid tight seal between these parts is likewise assured irrespective of relative rotary movement between the parts, as in FIG. 5. Moreover, by making the piston separate from the closure cap, a variety of inlet valve types can be combined with the piston, such as a ball check valve, an axially movable valve sleeve, a flexible valve which includes a flapper valve, an annular resilient valve, etc. Still further, the invention applies to a variety of dispensing pumps having a lock ring or not, both capable of plunger lock-up and/or plunger lock-down in whch the piston takes on additional functions of inlet valving, a vent sleeve, a rotary seal, etc.

Obviously, many other modifications and variations of the present invention are made possible in the light of the above teachings. It is therefore to be understood that within the scope of the appended claims the invention may be practiced otherwise than as specifically described.

What is claimed is:

1. A pressure accumulating dispensing pump comprising, an assembly comprising a pump body and a separate piston member, said body including a closure cap for securing said assembly in fluid tight communication with the opening of a container of flowable product to be dispensed, said assembly having a container vent opening therein, and said piston sealingly engaging said body and lying along the central axis thereof, plunger means comprising an annular plunger resiliently urged into a fully raised position and mounted for reciprocation on said piston member to define therewith a variable volume pump chamber, said piston member including an inlet valve, said plunger means further comprising a plunger head slideably disposed on said plunger and having a discharge passage adapted to be opened and closed by said plunger upon changes in pressure within said chamber upon reciprocation of said head, said assembly and said plunger head having cooperating means for limiting said head at said fully raised position, said piston having an annular lip seal in sealing engagement with said plunger, said assembly further comprising a cylindrical wall spaced from and surrounding said piston member to therewith define a vent chamber which includes said vent opening, an annular vent seal on said plunger means in sealing engagement with an inner surface of said wall for closing said vent chamber while said plunger is in its raised position and during an initial downstroke reciprocation thereof, said vent seal being further adapted to open said vent chamber upon a further downstroke reciprocation of said plunger, said plunger head and said body each being of a first material having a predetermined hardness for durability and strength, and said piston and said plunger each being of a second material which is softer and more compliant than said first material, for thereby enhancing said sealing engagements between said lip seal and said plunger and between said vent seal and said wall, to positively prevent leakage of product from said chambers.

2. The pump according to claim 1, wherein said piston member comprises a hollow piston defining an inlet passage and further comprises said cylindrical wall in sealed engagement with said pump body.

3. The pump according to claim 1, wherein said pump body further includes an upstanding tubular post lying along said axis and having an inlet passage, said piston comprising an axially movable sleeve member on said post for opening and closing said inlet passage in response to changes in pressure within said pump chamber.

4. The pump according to claim 3, wherein said post has a conical wall at its upper end with inlet ports therein, and said inlet valve comprises an annular flange of frustoconical configuration matching said conical wall for opening and closing said ports.

5. The pump according to claim 4, wherein said post has an annular stop shoulder, the lower end of said sleeve sealingly engaging said shoulder in a valve closing position of said sleeve.

6. The pump according to claim 3, wherein said pump body further includes said cylindrical wall.

7. The pump according to claim 1, wherein said pump body further includes an upstanding tubular post lying along said axis and having an inlet passage, said piston comprising a sleeve member mounted on said post against axial movement, an upper end of said post defining a valve seat, and said inlet valve comprising an annular resilient valve having ports therein.

8. The pump according to claim 7, wherein said post and the lower end of said sleeve have sealingly engaging conical surfaces which flare outwardly from said central axis for sealing said pump chamber against entry of air during the suction stroke of said plunger.

9. The pump according to claim 1, wherein said pump body further includes an upstanding post lying along said axis and having an inlet passage, said piston comprising a sleeve member fixed on said post, an upper end of said post defining a valve seat, and said inlet valve comprising a flexible flap valve.

10. The pump according to claim 7, wherein said sleeve engages said post to define an annular packing seal for sealing said pump chamber against entry of air during the suction stroke of said plunger.

11. The pump according to claim 9, wherein said piston includes said cylindrical wall.

12. The pump according to claim 7, wherein said piston includes said cylindrical wall and a lock ring, said piston being rotatably mounted on said post, and said sleeve engaging said post to define an annular packing seal.

13. The pump according to claim 2, wherein annular overlapping flanges extend radially from said cylindrical wall and from said pump body, an annular groove provided in one of said flanges receiving an annular tongue provided in the other of said flanges and defining said sealed engagement between said piston and said pump body.

* * * * *